United States Patent
Goto (10) Patent No.: US 9,807,583 B2
(45) Date of Patent: Oct. 31, 2017

(54) COMMUNICATION APPARATUS, CONTROL METHOD THEREOF, AND RECORDING MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 14/140,921

(22) Filed: Dec. 26, 2013

(65) Prior Publication Data

US 2014/0185602 A1     Jul. 3, 2014

(30) Foreign Application Priority Data

Dec. 28, 2012 (JP) ................ 2012-287246

(51) Int. Cl.
| | |
|---|---|
| *H04W 8/00* | (2009.01) |
| *H04W 84/12* | (2009.01) |
| *H04W 92/18* | (2009.01) |
| *H04W 48/16* | (2009.01) |
| *H04W 84/20* | (2009.01) |

(52) U.S. Cl.
CPC ............ *H04W 8/005* (2013.01); *H04W 48/16* (2013.01); *H04W 84/12* (2013.01); *H04W 84/20* (2013.01); *H04W 92/18* (2013.01)

(58) Field of Classification Search
None
See application file for complete search history.

(56) References Cited

U.S. PATENT DOCUMENTS

| | | | | | |
|---|---|---|---|---|---|
| 2010/0115067 | A1* | 5/2010 | Brant | ................ | H04L 29/12216 709/221 |
| 2011/0243112 | A1* | 10/2011 | Misumi | ................ | H04W 76/02 370/338 |
| 2012/0051345 | A1* | 3/2012 | Vedantham | ........... | H04L 67/104 370/338 |
| 2015/0063206 | A1* | 3/2015 | Kneckt | ................ | H04W 16/14 370/328 |

FOREIGN PATENT DOCUMENTS

| | | |
|---|---|---|
| JP | 2003-078531 A | 3/2003 |
| JP | 2008-270927 A | 11/2008 |
| JP | 2009-038665 A | 2/2009 |
| JP | 2009-246419 A | 10/2009 |
| JP | 2009-302649 A | 12/2009 |
| JP | 2011-35768 A | 2/2011 |
| WO | 2012/174152 A2 | 12/2012 |

* cited by examiner

*Primary Examiner* — Angela Nguyen
(74) *Attorney, Agent, or Firm* — Canon USA, Inc. I.P. Division (57) ABSTRACT

According to an instruction for starting processing for connecting to another communication apparatus, a communication apparatus prompts a user to select whether the communication apparatus joins an existing network or establishes a new network, searches another communication apparatus establishing the existing network when the user selects to join the existing network, searches another communication apparatus not establishing the existing network when the user selects to establish the new network, and then connects to the another searched communication apparatus.

10 Claims, 9 Drawing Sheets

COMMUNICATION APPARATUS, CONTROL METHOD THEREOF, AND RECORDING MEDIUM

BACKGROUND OF THE INVENTION

Field of the Invention

Aspects of the present invention generally relate to a communication apparatus, a control method thereof, and a recording medium recording a computer program.

Description of the Related Art

In recent years, a case has been increasing where an electronic device such as a digital camera is mounted with a station function of a wireless local area network (LAN) so that a user can use the electronic device connected to the wireless LAN as a communication apparatus. For example, Japanese Patent Application Laid Open No. 2011-35768 discusses a method for mounting a wireless LAN function to the digital camera and uploading image data to a server via the wireless LAN.

Further, to directly connect the electronic devices to each other, an access point function (base station function) of the wireless LAN can be built in the electronics device such as the digital camera. When the access point function of the wireless LAN is mounted to the electronics device, to facilitate allocation of an Internet Protocol (IP) address, a dynamic host configuration protocol (DHCP) server function can be also mounted together.

The Wireless Fidelity (Wi-Fi) Alliance set a standard of Wi-Fi Direct, which specifies a protocol for determining by which function of a wireless LAN access point and a wireless LAN station each electronic device is operated. The protocol specified by the Wi-Fi Direct is performed to automatically determine which of the electronic devices is set to be the wireless LAN access point and which is set to be the wireless LAN station, thereby improving user's convenience.

As described above, by using the electronic device such as the digital camera as the communication apparatus, the convenience can be improved. Further, since it can be automatically determined whether the communication apparatus is set to the wireless LAN access point or the wireless LAN station, a network can be easily established.

In such a state, when a user attempts to connect a certain communication apparatus to another communication apparatus, both cases of forming a new network with the another communication apparatus and of connecting the certain communication apparatus to the another communication apparatus being connected to an existing network are possible.

However, conventionally, when the user operates the certain communication apparatus to select the another communication apparatus that is to become a connection destination, the user cannot find out whether the another communication apparatus can form a new network or it is already connected to an existing network. Thus, the user has difficulty to select a desired connection destination.

SUMMARY OF THE INVENTION

Aspects of the present invention are generally related to a user easily selecting a desired connection destination.

According to an aspect of the present invention, a communication apparatus includes an instruction unit configured to instruct to start processing for connecting to another communication apparatus, a selection unit configured to, according to an instruction by the instruction unit, prompt a user to select whether the communication apparatus joins an existing network or establishes a new network, a search unit configured to, when the user selects to join the existing network, search another communication apparatus establishing the existing network, and, when the user selects to establish the new network, search another communication apparatus not establishing the existing network, and a connection unit configured to connect to the another communication apparatus searched by the search unit.

Further features of the present disclosure will become apparent from the following description of exemplary embodiments with reference to the attached drawings.

DESCRIPTION OF PREFERRED EMBODIMENTS

With reference to the attached drawings, a communication apparatus according to the present exemplary embodiment will be described in detail below. A wireless LAN system based on IEEE 802.11 series will be described as an example, however a communication form is not necessarily limited to a wireless LAN based on IEEE 802.11.

Figure 1:
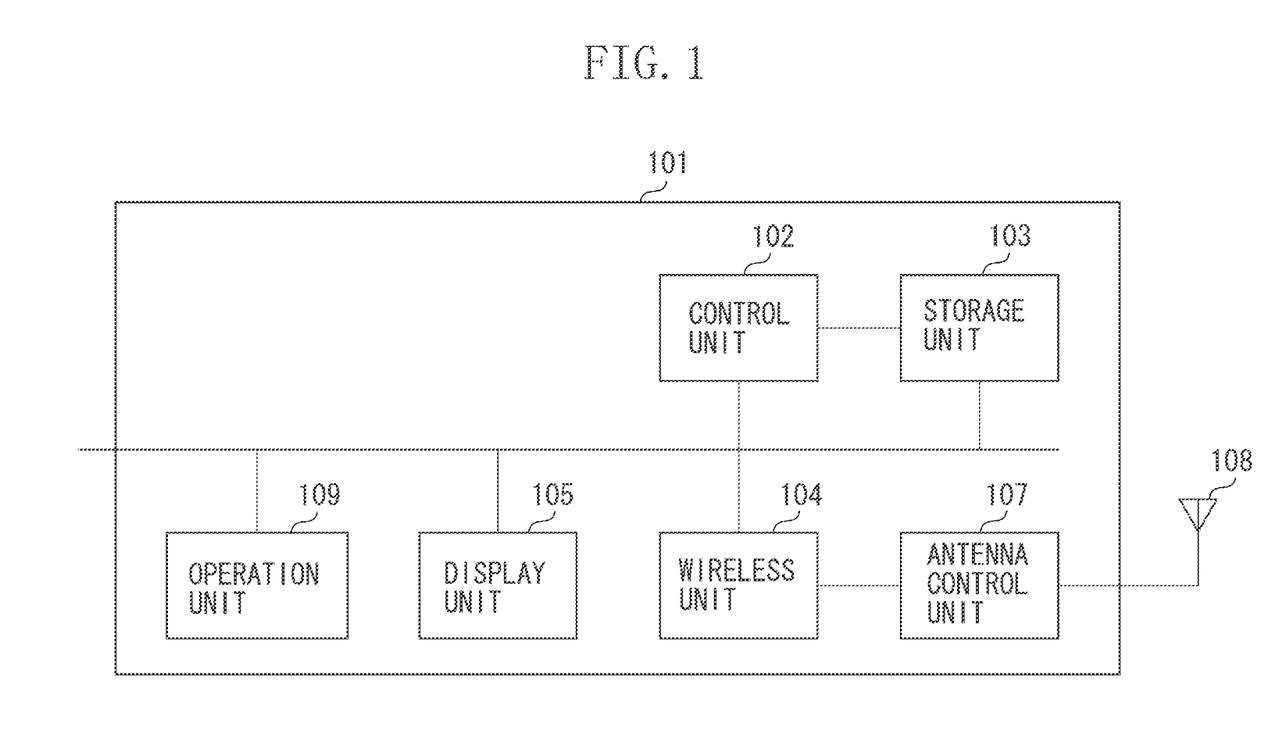
FIG. 1 is a block diagram illustrating a hardware of a communication apparatus according to a present exemplary embodiment.

FIG. 1 is a block diagram illustrating an example of a hardware configuration of a communication apparatus according to a present exemplary embodiment.

FIG. 1 illustrates a communication apparatus 101 and a control unit 102 that controls an entire communication apparatus by performing a control program stored in a storage unit 103. The control unit 102 includes one or more processors as a central processing unit (CPU) and a micro processing unit (MPU). Further, the control unit 102 controls setting of a communication parameter between the communication apparatus 101 and another apparatus. A storage unit 103 stores various types of control programs executed by the control unit 102 and various types of information such as the communication parameter. Further, the storage unit 103 may store image data or a file generated by the communication apparatus or received from an external apparatus. The storage unit 103 includes various types of memories such as a read only memory (ROM), a random access memory (RAM), a hard disk drive (HDD), and a flash memory. Various types of operations of the communication apparatus described below are performed when the control unit 102 executes the control program stored in the storage unit 103.

A wireless unit 104 performs communication via the wireless LAN based on the IEEE 802.11 series. A display unit 105 performs various types of displays and has a function capable of outputting information that can be visually recognized, for example a liquid-crystal display (LCD) and a light-emitting diode (LED), or capable of outputting audio, for example a speaker. The display unit 105 has a function for outputting at least either one of visual information or audio information. An antenna control unit 107 controls an antenna 108 to transmit/receive a signal via wireless communication. An operation unit 109 is used by a user to perform various types of input to operate the communication apparatus 101. The operation unit 109 includes various types of buttons or a touch panel. The communication apparatus 101 may include a hardware configuration other than the hardware configuration illustrated in FIG. 1. For example, when the communication apparatus 101 is a digital camera, it includes an image capturing unit, and when the communication apparatus 101 is a printer, it includes a printing unit.

Figure 2:
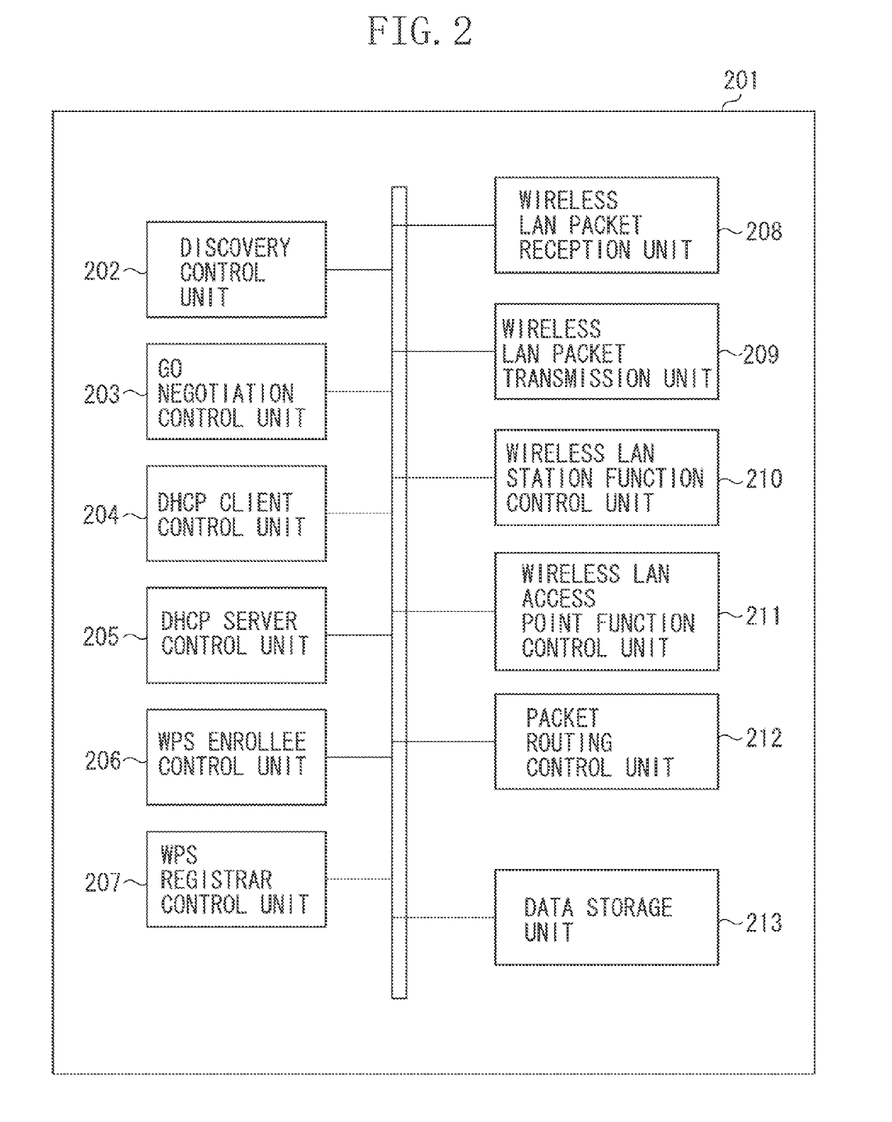
FIG. 2 is a block diagram illustrating a software function of the communication apparatus according to the present exemplary embodiment.

FIG. 2 is a block diagram illustrating an example of a software configuration of the communication apparatus 101 according to the present exemplary embodiment.

FIG. 2 illustrates an entire software function block 201. A discovery control unit 202 causes search processing for searching a communication apparatus, which is a partner communication apparatus, to be performed.

Figure 4:
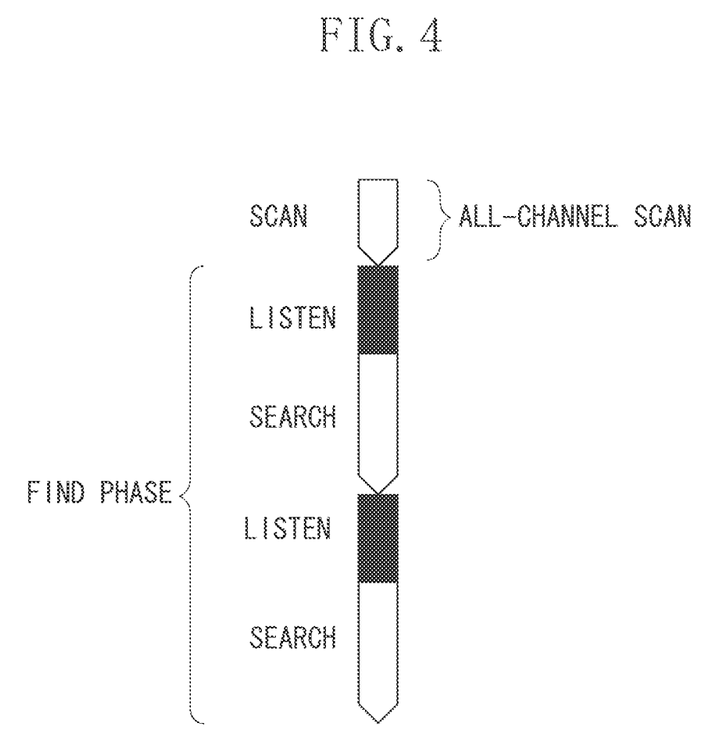
FIG. 4 illustrates an example of partner apparatus search by Wi-Fi Direct.

With reference to FIG. 4, discovery processing (search processing) specified by Wi-Fi Direct will be described. When the user activates Wi-Fi Direct via the operation unit 109, first, all-channel scan referred to as a "scan phase" is performed. In this phase, in addition to a Wi-Fi Direct device, a device for a wireless LAN access point not the Wi-Fi Direct device can be a search target. More specifically, either of active scan and passive scan is performed. In the active scan, a prove request is transmitted to all channels, and a prove response is waited from the Wi-Fi Direct device and the wireless LAN access point. On the other hand, in the passive scan, sequentially to the all channels, a beacon respectively transmitted periodically from the Wi-Fi Direct device and the wireless LAN access point is waited. When the scan phase is finished, subsequently, Wi-Fi Direct device search processing referred to as a "find phase" is performed. In the find phase, waiting processing (listen) is performed at a previously designated channel and, after a predetermined time elapses, the search processing (search) is performed. The channel used in the waiting processing and the search processing is limited to a specified channel, at which a partner apparatus can be searched more quickly than when the all channels are scanned.

FIG. 2 illustrates a GO negotiation control unit 203 performing control based on a Wi-Fi Direct protocol. The GO negotiation control unit 203 determines functions of the communication apparatuses, more specifically, which communication apparatus operates as an access point of the wireless LAN and which communication apparatus operates as a station of the wireless LAN. In Wi-Fi Direct, the communication apparatus performing an access point function of the wireless LAN is referred to as a P2P group owner (hereinafter, may be referred to simply as "GO"). Further, the communication apparatus performing a station function of the wireless LAN is referred to as a P2P client (hereinafter, may be simply referred to as "CL"). When the communication apparatus operates as the access point of the wireless LAN (when operating as the GO), a wireless LAN access point function control unit 211 described below is activated, and when it operates as the station of the wireless LAN (when operating as the CL), a wireless LAN station function control unit 210 described below is activated. Details of the protocol of GO Negotiation are specified by the Wi-Fi Direct standard, and not described herein. In this specification, a group of the P2P group owner (GO), the P2P client (CL), and groups of the Wi-Fi Direct certified communication apparatuses with its function undetermined are collectively referred to as a P2P device.

A DHCP client control unit 204 is activated when the function of the communication apparatus is set as the P2P client in the GO negotiation control unit 203. A DHCP server control unit 205 is activated when the function of the communication apparatus is set as the P2P group owner in the GO negotiation control unit 203. The DHCP server control unit 205 performs processing for allocating an IP address to the DHCP client according to a DHCP protocol in response to a request from the DHCP client. The DHCP client control unit 204 requests an allocation of the IP address from the DHCP server according to the DHCP protocol.

A Wi-Fi protected setup (WPS) enrollee control unit 206 receives a communication parameter for performing communication via the wireless LAN from another WPS registrar device. The WPS enrollee control unit 206 operates, similarly to the DHCP client control unit 204, when the function of the communication apparatus is set as the P2P client. A WPS registrar control unit 207 provides another WPS enrollee device with the communication parameter for performing the communication via the wireless LAN. The WPS registrar control unit 207 operates, similarly to the DHCP server control unit 205, when the function of the communication apparatus is set as the P2P group owner. The communication parameter provided by the WPS registrar adopts a service self-identifier (SSID) as a network identifier, an encryption key, an encryption method, an authentication key, and an authentication method.

A wireless LAN packet reception unit 208 receives and a wireless LAN packet transmission unit 209 transmits various types of packets including upper layer communication protocols. A wireless LAN station function control unit 210 performs authentication and encryption processing when the communication apparatus operates as the P2P client. A wireless LAN access point function control unit 211 performs the authentication and encryption processing, and management of a communication partner apparatus when the communication apparatus operates as the P2P group owner. Either one of the wireless LAN station function control unit 210 and the wireless LAN access point function control unit 211 can operate, or both of them can simultaneously operate. In other words, the communication apparatus according to the present exemplary embodiment can, while operating as the station in a certain wireless LAN, operate as the access point in another wireless LAN.

A packet routing control unit 212 performs bridge and routing on a communication packet when the wireless LAN access point function control unit 211 is operating. A data storage unit 213 retains software itself, and various types of tables including a wireless LAN parameter, a DHCP address table described above, an address resolution protocol (ARP) table, and such.

Figure 3:
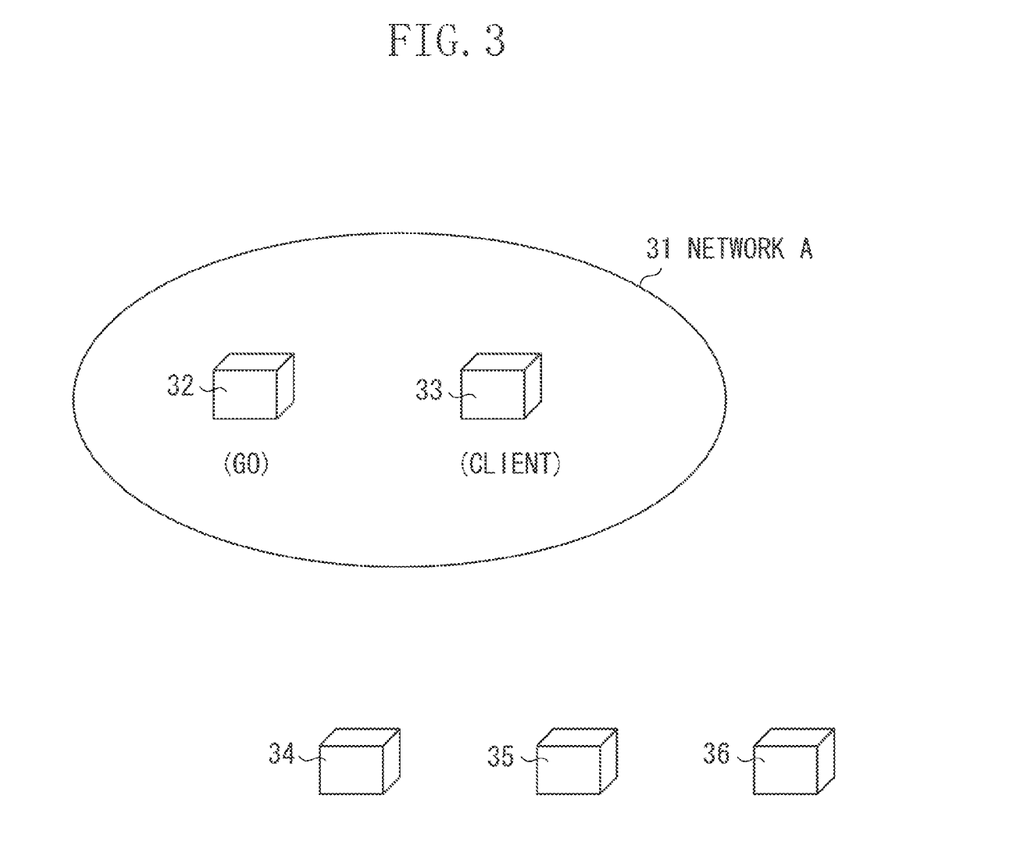
FIG. 3 illustrates an example of a network system configuration according to the present exemplary embodiment.

All function blocks illustrated in FIG. 3 may be provided by software or, alternatively, by hardware. The function blocks illustrated in FIG. 3 have mutual relationships. Further, each function block illustrated in FIG. 3 is only an example, and a plurality of function blocks may constitute one function block, or any of function blocks may be further divided into blocks performing a plurality of functions.

FIG. 3 illustrates a network system configuration according to the present exemplary embodiment. According to the example illustrated in FIG. 3, the network system includes a communication apparatus A 32, a communication apparatus B 33, a communication apparatus C 34, a communication apparatus D 35, and a communication apparatus E 36. The network system further includes a network A 31 (hereinafter, referred to as a "network A") including the communication apparatus A and the communication apparatus B. In the example of FIG. 3, in the network A, the communication apparatus A operates as the GO, and the communication apparatus B operates as the CL. All apparatuses illustrated in FIG. 3 have the configurations illustrated in FIGS. 1 and 2, and are certified by Wi-Fi Direct.

Figure 5A:
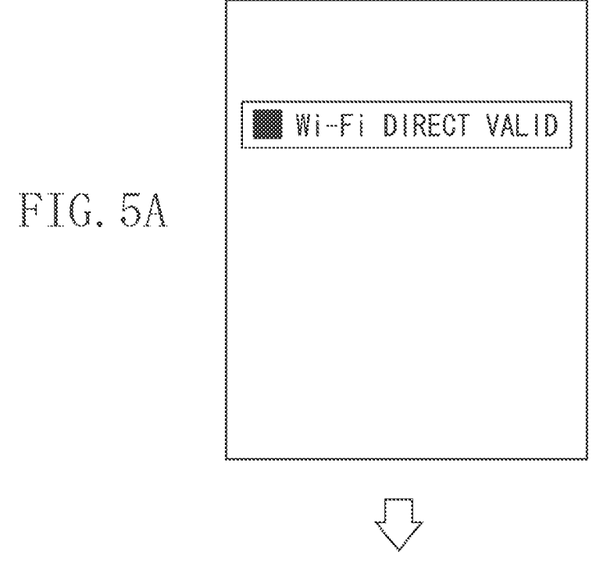
FIGS. 5A and 5B illustrate examples of display screens of a Wi-Fi Direct certified communication apparatus.
Figure 5B:
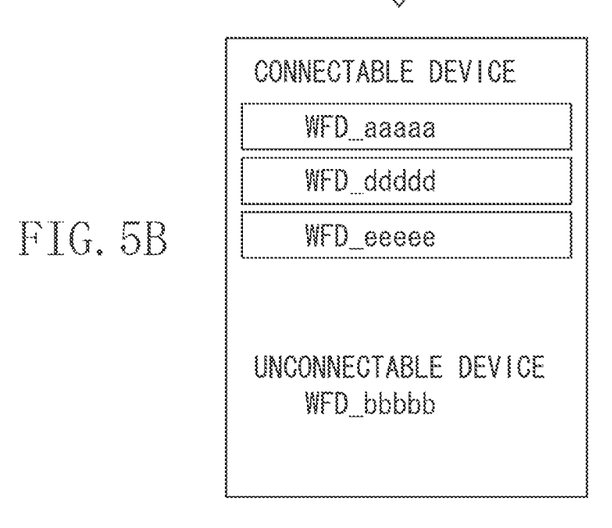

FIGS. 5A and 5B illustrate the network system illustrated in FIG. 3, and are examples of screens displayed on the display unit 105 of the communication apparatus C when Wi-Fi Direct is set to be valid in the communication apparatus C. When the user operates the screen illustrated in FIG. 5A to set Wi-Fi Direct to be valid, in the discovery control unit 202, the above-described search processing is performed. As a result of the processing, the communication apparatus A, the communication apparatus B, the communication apparatus D, and the communication apparatus E that are Wi-Fi Direct devices are found. Then, the screen illustrated in FIG. 5B is displayed. On the screen illustrated in FIG. 5B, a "connectable device" and an "unconnectable device" are separately displayed. The "connectable device" herein indicates the communication apparatus of the Wi-Fi Direct GO and the communication apparatus with its function undetermined. On the other hand, the "unconnectable device" indicates the communication apparatus of the Wi-Fi Direct CL. According to this example, since the communication apparatus B is the Wi-Fi Direct CL, "WFD_bbbbb" indicating the communication apparatus B is displayed as the "unconnectable device", and other communication apparatuses are displayed as the "connectable device". In FIG. 5B, "WFD_aaaaa", "WFD_bbbbb", "WFD_ddddd", and "WFD_eeeee" respectively indicate the communication apparatus A, the communication apparatus B, the communication apparatus D, and the communication apparatus E. They are device names of the Wi-Fi Direct protocols. The device names can be changed by the user, or can have a specific value as the communication apparatus.

In a display example illustrated in FIG. 5B, the user can find out whether the Wi-Fi Direct certified communication apparatus searched by the search processing is the "connectable device" or the "unconnectable device". However, the user cannot recognize which communication apparatus of the "connectable devices" is the GO and which communication apparatus is the apparatus with its function undetermined. More specifically, it is not known which communication apparatus is to be selected to join the existing network, and which communication apparatus is to be selected to establish the new network. The display examples illustrated in FIGS. 6A, 6B, and 6C attempt to solve the problem.

Figure 6A:
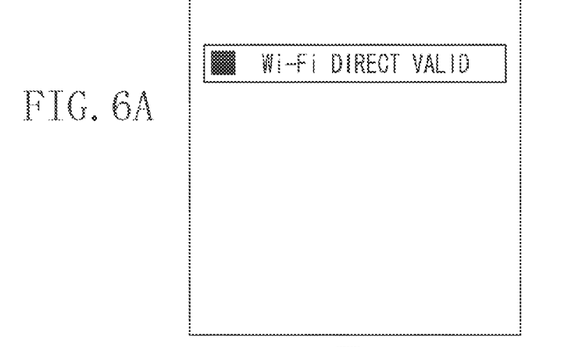
FIGS. 6A, 6B, and 6C illustrate examples of display screens of the communication apparatus according to the present exemplary embodiment.
Figure 6B:
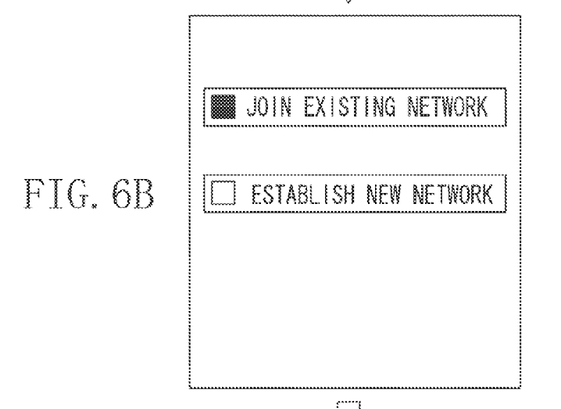
Figure 6C:
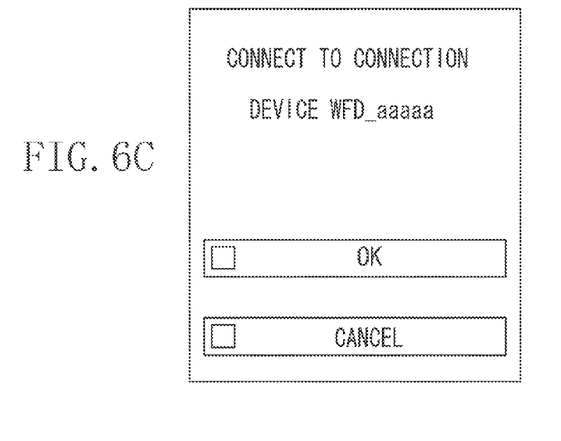

FIGS. 6A, 6B, and 6C illustrate examples of the screens displayed on the display unit 105 of the communication apparatus C when Wi-Fi Direct is set to be valid in the communication apparatus C in the network system illustrated in FIG. 3. When the user operates the screen illustrated in FIG. 6A for setting Wi-Fi Direct to be valid, before the search processing is performed by the discovery control unit 202, the screen illustrated in FIG. 6B is displayed. On the screen illustrated in FIG. 6B, the user is prompted to select "JOIN EXISTING NETWORK" or "ESTABLISH NEW NETWORK". When the user selects either of the options displayed in FIG. 6B, the search processing is performed by the discovery control unit 202. The example illustrated in FIG. 6B indicates a case where "JOIN EXISTING NETWORK" is selected, and, resultingly, FIG. 6C is displayed. According to the example illustrated in FIG. 3, since the communication apparatus in the existing network, in other words, the communication apparatus establishing the network is only the communication apparatus A operating as the GO, "WFD_aaaaa" indicating the communication apparatus A is displayed as a search result on the screen illustrated in FIG. 6C. When the user selects OK on the screen illustrated in FIG. 6C, the communication apparatus C starts to connect to the communication apparatus A and, when "cancel" is selected, the screen returns to the screen illustrated in FIG. 6B. On the screen illustrated in FIG. 6C, in addition to the device name of the communication apparatus A, the device name of the communication apparatus B, which is the P2P client establishing the network, may be displayed together with the communication apparatus A as reference information.

On the other hand, when "ESTABLISH NEW NETWORK" is selected on the screen illustrated in FIG. 6B, the communication apparatus D and the communication apparatus E with their Wi-Fi Direct functions undetermined are searched, and the device names of the two apparatuses are displayed.

As described above, according to the display examples illustrated in FIGS. 6A, 6B, and 6C, it can be recognized which communication apparatus is to be selected to join the existing network and which communication apparatus is to be selected to establish the new network. Therefore, when the user selects the connection destination of the communication apparatus, the user can more easily selects the desired connection destination.

According to the examples illustrated in FIGS. 6A, 6B, and 6C, the user selects either one of the options of "JOIN EXISTING NETWORK" and "ESTABLISH NEW NETWORK", however, either one thereof may be automatically selected based on other information. For example, when the operated communication apparatus is a digital camera in a usage case of performing print processing, "JOIN EXISTING NETWORK" may be automatically selected. In a usage case of sharing photos, "ESTABLISH NEW NETWORK" may be automatically selected. In many cases, it is expected that the print processing is performed between the apparatus and a stationary type printer, and the photos are shared via the network temporarily established at a venue of a wedding reception, for example. The cases are not limited to the usage cases described above. Terms of "JOIN EXISTING NETWORK" and "ESTABLISH NEW NETWORK" may be displayed in other terms indicating the similar meanings.

Figure 7:
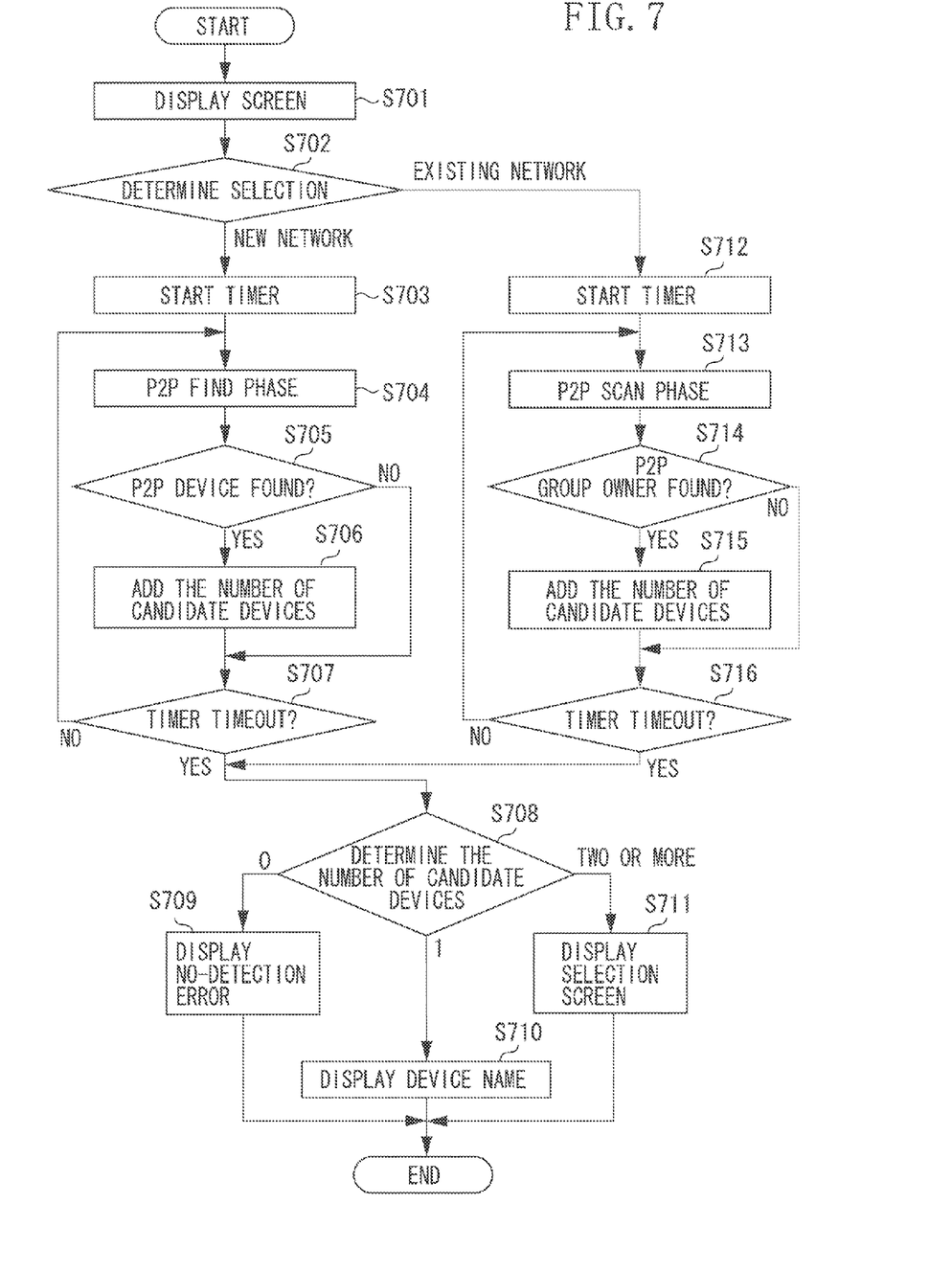
FIG. 7 is a flowchart illustrating operations of the communication apparatus according to the present exemplary embodiment.

With reference to FIG. 7, processing performed by the communication apparatus according to the present exemplary embodiment will be described below. The flowchart illustrated in FIG. 7 shows the processing performed when the communication apparatus displays the screens illustrated in FIGS. 6A, 6B, and 6C. Each step of the flowchart is processed when the control unit 102 executes the program stored in the storage unit 103.

In step S701, the communication apparatus displays the screen illustrated in FIG. 6B on the display unit 105 in response to the Wi-Fi Direct function set to be valid by the user on the screen illustrated in FIG. 6A displayed on the display unit 105. In step S702, the control unit 102 determines which of the options displayed on the screen illustrated in FIG. 6B is selected by the user. When "JOIN EXISTING NETWORK" is selected by the user, the processing proceeds to step S712, and when "ESTABLISH NEW NETWORK" is selected thereby, the processing proceeds to step S703. The user does not necessarily have to follow the example illustrated in FIG. 6B. As described above, the selection may be automatically performed by selecting a purpose (usage case of image printing, image transfer, and image sharing) for using the communication apparatus. Particularly, when the communication apparatus is a digital camera and when the image is shared among the digital cameras, a new network is always selected to improve the user's convenience.

In step S703, the control unit 102 starts a timer. The timer measures timeout of the search processing to be performed subsequently. In step S704, the control unit 102 performs the search processing for searching the Wi-Fi Direct certified communication apparatus. Of the search processing performed by the discovery control unit 202 described above, the scan phase is omitted and the find phase starts. In other words, the probe request is transmitted to the channel previously specified, and the probe response is waited to be received. A reason for omitting the scan phase in the processing in step S704 is searching the GO is not required for the purpose of establishing the new network. In other words, the scan phase is not required to search the GO. The scan phase is omitted so that the desired communication apparatus can be searched more quickly. In step S705, the control unit 102 determines whether, as a result of the search processing, the P2P device has been found. More specifically, when the probe response for the probe request transmitted in step S704 is received, its content is analyzed. As a result of the analysis, when a transmission source of the probe response is not the GO, information about the transmission source including a device name is stored in the storage unit 103 as a candidate device. Whether the transmission source is the GO is determined with reference to predetermined information included in the probe response, or based on the device name. In step S706, the control unit 102 adds the number of candidate devices each time information about the candidate device is stored in the storage unit 103, and retains the information. In step S707, the control unit 102 determines whether the timer started in step S703 has been time out, and when it has been time out (YES in step S707), the processing proceeds to step S708. Until the timer becomes time out, subsequent searching processing of step S704 continues.

In step S702, when it is determined that "JOIN EXISTING NETWORK" is selected by the user, the processing proceeds to step S712. In step S712, the control unit 102 starts the timer. Similarly to step S703, the timer measures time out of the search processing to be performed subsequently. The time-out time may be the same as that of the timer starting in step S703, or may be different from that thereof. In step S713, the control unit 102 performs the search processing for searching the Wi-Fi Direct certified communication apparatus. The search processing is performed without omitting the scan phase described above. In other words, the discovery control unit 202 performs the active scan or the passive scan on all channels. In step S714, as a result of the search processing, the control unit 102 determines whether the P2P group owner has been found. More specifically, when the probe response for the prove request transmitted in step S713 is received, or the beacon is received, its content is analyzed. As a result of the analysis, when the transmission source of the probe response is the GO, the information about the transmission source including the device name is stored in the storage unit 103 as the candidate device. Whether the transmission source is the GO is determined with reference to the predetermined information included in the probe response or the beacon, or based on the device name. In step S715, the control unit 102 adds the number of candidate devices each time the information about the candidate device is stored in the storage unit 103, and retains the information. In step S716, the control unit 102 determines whether the timer started in step S712 has been time out, and when it has been time out (YES in step S716), the processing proceeds to step S708. Until the timer becomes time out, the subsequent searching processing of step S713 continues.

In step S708, based on the information stored in the storage unit 103, the control unit 102 determines the number of the candidate devices found by the search processing. When the number of the candidate devices is "0", then in step S709, the control unit 102 displays a message notifying that the Wi-Fi Direct device has not been searched, as an error notification on the display unit 105. When the number of the candidate devices is "1", then in step S710, as illustrated in FIG. 6C for example, the control unit 102 displays the device name of the searched communication apparatus on the display unit 105. Subsequently, in response to a user's instruction for connecting to the displayed communication apparatus, the control unit 102 performs processing for connecting to the communication apparatus. When the number of the candidate devices is "1", a screen display illustrated in FIG. 6C may be omitted, and without waiting for the user's instruction, the connection to the searched communication apparatus may start. In this case, operations performed by the user are reduced to further facilitate the user's operation.

In step S711, when two or more candidates are searched, the control unit 102 displays on the display unit 105 the device name of each of the two or more searched communication apparatuses. The screen displayed herein prompts the user to select the connection destination. In this case, in order for the user to more easily select the desired communication apparatus, additional information including information other than the device name and types of the communication apparatus (e.g., a digital camera and a printer) may be displayed together. In response to the user's selection of any communication apparatus on the screen displayed in step S711, the control unit 102 performs processing for connecting to the selected communication apparatus. When two or more candidate devices are specified, since it is difficult for the user to select the desired communication apparatus, a message may be displayed notifying that a plurality of communication apparatuses has been searched, and the processing may end as an error.

As described above, according to the present exemplary embodiment, when the communication apparatus is connected to another communication apparatus based on Wi-Fi Direct, the user can select whether to connect to the existing network or to establish the network. With this arrangement, the user can more easily select the desired connection destination to improve the convenience. Further, depending on whether to connect to the existing network or to establish the new network, the search processing for searching the Wi-Fi Direct device can be changed. With this arrangement, the desired connection destination can be more quickly searched.

According to the description with reference to FIG. 7, when it is selected to join the existing network, then in step S713, the search processing based on Wi-Fi Direct is performed to search the P2P group owner. However, the wireless LAN access point may be searched. In this case, in step S713, the processing as a normal wireless LAN station is performed. Also in this case, "P2P SCAN PHASE" in step S713 can be replaced with "normal scan processing", and "P2P GROUP OWNER FOUND?" in step S714 can be replaced with "WHETHER THE WIRELESS LAN ACCESS POINT CAN BE FOUND".

According to a first exemplary embodiment, the example is described for performing the search processing when the user selects the communication partner based on Wi-Fi Direct, after whether to join the existing network or to establish the new network is selected. On the other hand, according to the present exemplary embodiment, after the search processing has been previously performed, the user selects whether to join the existing network or to establish the new network. A second exemplary embodiment will be described in detail below.

Since the hardware configuration of the communication apparatus, a software configuration, and the network system configuration according to the second exemplary embodiment are the same as the first exemplary embodiment, they will not be described herein.

Figure 8A:
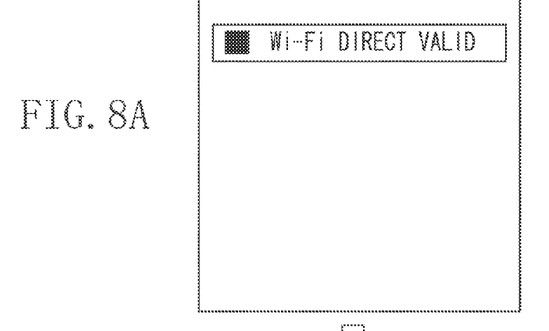
FIGS. 8A, 8B, and 8C illustrate examples of display screens of the communication apparatus according to the present exemplary embodiment.
Figure 8B:
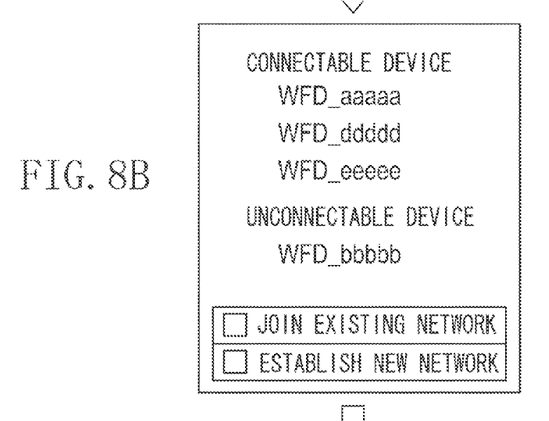
Figure 8C:
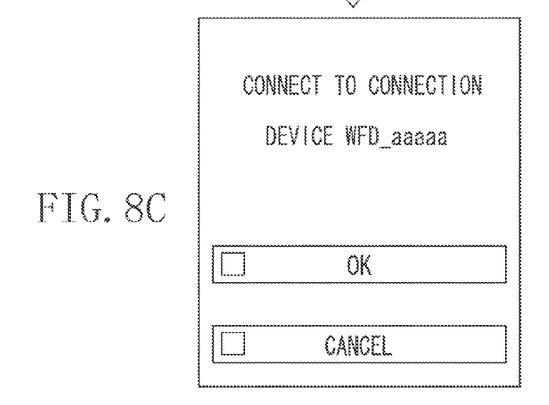

FIGS. 8A, 8B, 8C, and 8D are examples of screens displayed on the display unit 105 of the communication apparatus C, when Wi-Fi Direct is set to be valid in the communication apparatus C in the network system illustrated in FIG. 3. When the user operates a screen illustrated in FIG. 8A for setting Wi-Fi Direct to be valid, the above-described search processing is performed by the discovery control unit 202. As a result, the communication apparatus A, the communication apparatus B, the communication apparatus D, and the communication apparatus E that are the Wi-Fi Direct devices are found. Then, the screen illustrated in FIG. 8B is displayed. On the screen illustrated in FIG. 8B, in addition to the "connectable device" and the "unconnectable device" that are separately displayed, the options of "JOIN EXISTING NETWORK" and "ESTABLISH NEW NETWORK" are displayed. For example, when the user selects "JOIN EXISTING NETWORK" of the options illustrated in FIG. 8B, the screen illustrated in FIG. 8C is displayed. Since joining the existing network means connecting to the GO, only the GO is filtered among the connectable devices illustrated in FIG. 8B and displayed as illustrated in FIG. 8C. According to the example illustrated in FIG. 3, since the existing network, in other words, the communication apparatus already having established the network is only the communication apparatus A operating as the GO, on the screen illustrated in FIG. 8C, "WFD_aaaaa" indicating the communication apparatus A is displayed as a filtering result. When the user selects OK via the screen illustrated in FIG. 8C, the communication apparatus C starts to connect to the communication apparatus A, and if "cancel" is selected, the screen returns to the screen illustrated in FIG. 8A again. On the screen illustrated in FIG. 8C, in addition to the device name of the communication apparatus A, the device name of the communication apparatus B, which is the P2P client establishing the network, may be displayed together with the communication apparatus A as reference information. On the other hand, when "ESTABLISH NEW NETWORK" is selected on the screen illustrated in FIG. 8B, the communication apparatus D and the communication apparatus E with Wi-Fi Direct function undetermined are filtered, and the device names of the two apparatuses are displayed.

As described above, according to the display examples illustrated in FIGS. 8A, 8B, and 8C, to join the existing network, it can be known which communication apparatus is to be selected, and to establish the new network, it can be known which communication apparatus is to be selected. Therefore, when the user selects the connection destination of the communication apparatus, the desired connection destination can be more easily selected. Further, as illustrated in FIG. 8B, since all searched communication apparatuses are once displayed, the user can confirm how much communication apparatuses have been searched, and then can select the desired connection destination. According to the examples illustrated in FIGS. 8A, 8B, and 8C also, similarly to the description with reference to FIGS. 6A, 6B, and 6C, either of "JOIN EXISTING NETWORK" and "ESTABLISH NEW NETWORK" may be automatically selected based on other information than information about the selection and operation by the user.

Figure 9:
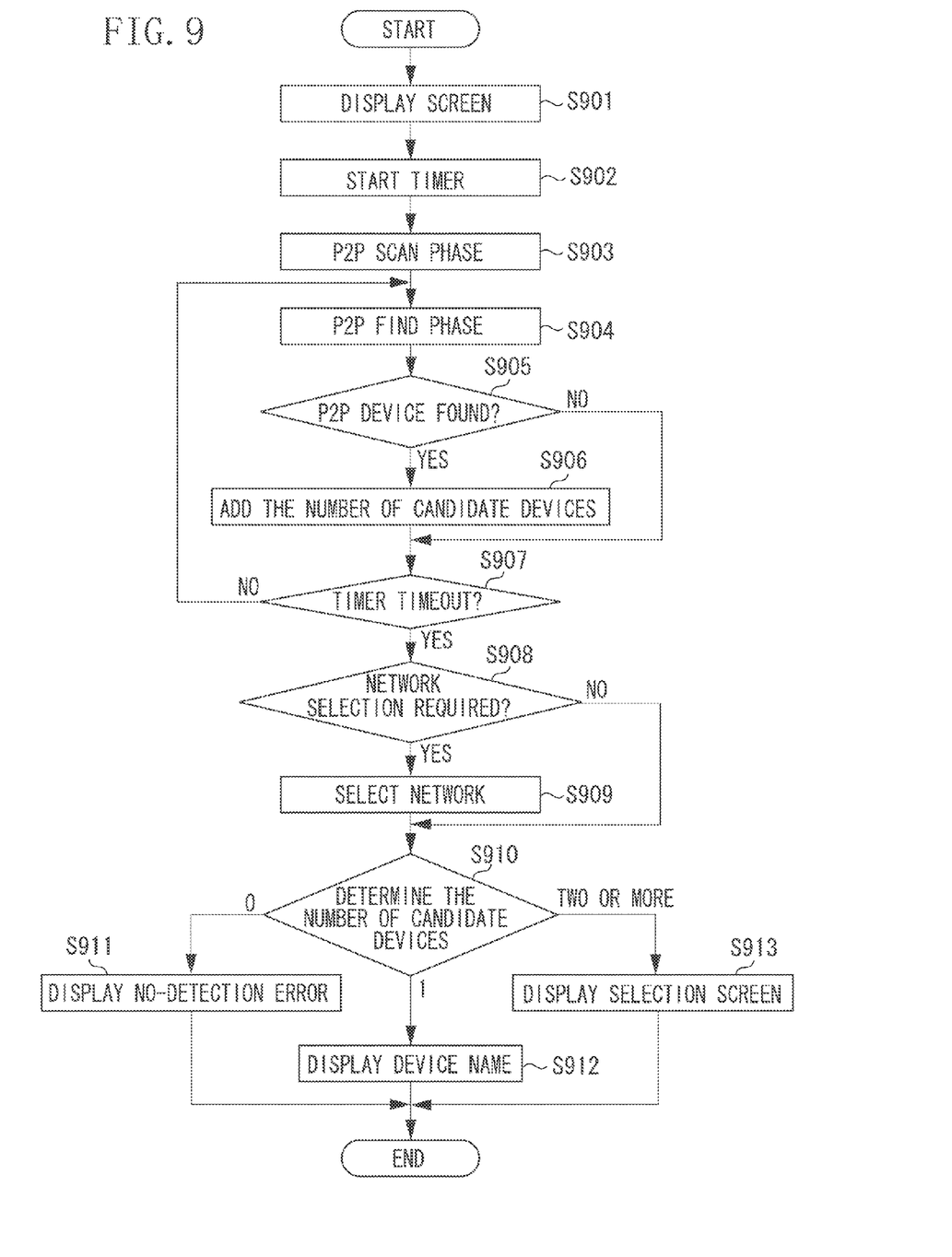
FIG. 9 is a flowchart illustrating operations of the communication apparatus according to the present exemplary embodiment.

With reference to FIG. 9, processing performed by the communication apparatus according to the present exemplary embodiment will be described. The flowchart in FIG. 9 illustrates processing when the communication apparatus displays screens illustrated in FIGS. 8A, 8B, and 8C. Further, each step of the flowchart illustrated in FIG. 9 is processed when the control unit 102 executes the program stored in the storage unit 103.

The communication apparatus in step S901 displays on the display unit 105 the screen indicating that the searching processing is being performed in response to the fact that the user sets the Wi-Fi Direct function to be valid on the screen illustrated in FIG. 9A displayed on the display unit 105. In step S902, the control unit 102 starts the timer. This timer measures time out of the search processing.

In step S903, the control unit 102 starts the search processing and, first, performs all-channel scan processing based on Wi-Fi Direct, in other words, performs the scan phase. Next, in step S904, the control unit 102 performs the find phase based on Wi-Fi Direct. In step S905, the control unit 102 determines whether the P2P device has been found by the search processing performed in steps S903 and S904. More specifically, when the probe response for the probe request transmitted in steps S903 and S904 is received, its content is analyzed. As the result of the analysis, when the transmission source is the Wi-Fi Direct device, information about the transmission source including the device name is stored in the storage unit 103 as a candidate device. In step S906, the control unit 102 adds the number of the candidate devices each time the information about the candidate device is stored in the storage unit 103, and retains the information. In step S907, the control unit 102 determines whether the timer started in step S902 has been time out, and when it has been time out (YES in step S907), the processing proceeds to step S908. Until the timer becomes time out, the subsequent find phase of step S904 continues.

In step S908, the control unit 102 determines whether the selection processing of the network is required. The selection processing of the network is the processing for selecting "JOIN EXISTING NETWORK" or "ESTABLISH NEW NETWORK". In other words, the determination performed in step S908 corresponds to the processing for determining whether the screen displaying the options illustrated in FIG. 8B is required to be displayed. The communication apparatus detected by the search processing based on Wi-Fi Direct includes three types of communication apparatuses, which are a communication apparatus being operating with its function determined as the GO, a communication apparatus with being operating its function determined as the CL, and a communication apparatus with its function undetermined (undetermined whether to be the GO or the CL). The communication apparatus with its function determined as the CL of the three types of the communication apparatuses and a new communication apparatus cannot be directly connected (displayed as "unconnectable device"). Therefore, it is determined herein how many communication apparatuses with its function determined as the GO and communication apparatus with its function undetermined exist.

When one candidate device exists, the network selection processing is not required. Thus, in this case, in step S908, it is determined that the network selection processing is not required and the processing proceeds to step S910. Even if a plurality of candidate devices exists, when only either one type of the communication apparatus with its function determined as the GO and the communication apparatus with its function undetermined exists, the network selection processing is not required. For example, even if three devices are detected, if all of them are the GOs, the network selection processing is not required. That is because, in this case, the new network cannot be established. On the other hand, when all the candidate devices are the communication apparatus with its function undetermined, it is impossible to join the existing network. Thus, in this case also, the network selection processing is not required either. Therefore, in this case also, the processing proceeds to step S910.

On the other hand, when only one of three apparatuses is the GO and the rest of two apparatuses are the communication apparatuses with their functions undetermined, for example, i.e., when both types of the communication apparatuses, which are the communication apparatus with its function determined as the GO and the communication apparatus with its function undetermined, exist, the network selection processing is required. In other words, when "JOIN EXISTING NETWORK" or "ESTABLISH NEW NETWORK" can be selected, the network selection processing is required. In this case, the processing proceeds to step S909.

In step S909, the control unit 102 displays on the display unit 105 the screen including the options of "JOIN EXISTING NETWORK" and "ESTABLISH NEW NETWORK" as illustrated in FIG. 8B. Then, the selection by the user is received. In response to the user's selection of any of the options, the control unit 102 selects "JOIN EXISTING NETWORK" or "ESTABLISH NEW NETWORK". When the network is selected in step S909, then in step S910, the control unit 102 specifies the communication apparatus corresponding to the network selected from among the candidate devices in step S909. More specifically, when "JOIN EXISTING NETWORK" is selected in step S909, the communication apparatus with its function determined as the GO is specified from among the candidate devices. On the other hand, when "ESTABLISH NEW NETWORK" is selected in step S909, the communication apparatus with its function undetermined is specified from among the candidate devices. Subsequently, the control unit 102 determines the number of specified communication apparatuses.

When the number of the specified communication apparatuses is "0", then in step S911, the control unit 102 displays a message on the display unit 105, notifying that the corresponding communication apparatus has not been found. When the number of the specified communication apparatuses is "1", then in step S912, the control unit 102 displays on the display unit 105 the device name of the specified communication apparatus as illustrated in FIG. 8C, for example. Then, in response to a user's instruction for connecting to the displayed communication apparatus, the control unit 102 performs processing for connecting thereto. When the number of the candidate devices is "1", the screen display illustrated in FIG. 6C may be omitted, and without waiting for the user's instruction, the control unit 102 may start to connect to the specified communication apparatus. In this case, the operations performed by the user are reduced to further facilitate the user's operation.

When the number of the specified devices is 2 or more, then in step S913, the control unit 102 displays on the display unit 105 the device name of each of the two or more specified communication apparatuses. The screen displayed herein prompts the user to select the connection destination. In this case, in order for the user to more easily select the desired communication apparatus, information other than the device name and additional information including types of the communication apparatus (e.g., a digital camera and a printer) may be displayed together. In response to the user's selection of any of the communication apparatuses on the screen displayed in step S913, the control unit 102 performs processing for connecting to the selected communication apparatus. When two or more candidate devices are specified, since it is difficult for the user to select the desired communication apparatus, it may be displayed that a plurality of communication apparatuses has been searched, and then the processing may end as an error.

When it is determined that the network selection processing is not required in step S908 (NO in step S908), the processing proceeds to step S910. As the subsequent processing of step S910 as described above, any of the processing of steps S911, S912, and S913 is performed depending on the number of the candidate devices.

As described above, according to the present exemplary embodiment, when the communication apparatus is to be connected to another communication apparatus based on Wi-Fi Direct, the user can select whether to connect to the existing network or to establish the new network. With this arrangement, the user can select the desired connection destination more easily, thereby improving convenience.

Further, compared with the first exemplary embodiment, since the all searched communication apparatuses are once displayed in the second exemplary embodiment, the user can confirm how many communication apparatuses exist, and then select the desired connection destination.

Each exemplary embodiment described above are implementation examples, and various modifications can be made without departing from the spirit and scope of these embodiments. Further, the above-described first exemplary embodiment and second exemplary embodiment can be combined. Furthermore, the user may freely select whether each communication apparatus operates according to the first exemplary embodiment or the second exemplary embodiment.

The communication apparatus of the above-described exemplary embodiments is not limited to the digital camera or the printer. The communication apparatus may be a personal computer (PC), a tablet terminal, or a mobile terminal including a cellular phone and a smart phone. Further, it may be an image processing apparatus including a copy machine, a scanner, a fax, and a multifunction peripheral, and a digital home electrical appliance including a television set and a recorder.

Furthermore, the network including the communication apparatus is not limited to a wireless network in an ad hoc mode. Alternatively, it may be a wireless network of an infrastructure mode including the access point.

Moreover, the above-described exemplary embodiments use the wireless LAN based on IEEE 802.11 as the examples. However, these embodiments may be implemented by other wireless communication such as wireless universal serial bus (USB), multi-band orthogonal frequency division multiplexing (OFDM) alliance (MBOA), Bluetooth®, ultra-wide band (UWB), and Zigbee®. Further, the above-described exemplary embodiments may be implemented by a wired communication medium such as wired LAN. UWB includes wireless USB, wireless 1394, and wireless networking (WINET).

Additional embodiments can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present disclosure.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-287246 filed Dec. 28, 2012, which is hereby incorporated by reference herein in its entirety.

What is claimed is:

1. A communication apparatus comprising:
a memory;
a processor coupled to the memory which executes the following:
receiving a user instruction to select a search mode for searching a partner apparatus that performs communication conforming to a standard of Wi-Fi Direct;
searching, according to the received user instruction, a partner apparatus conforming to the standard of Wi-Fi Direct based on a first search mode or a second search mode,
wherein the first search mode is a mode for discovering an existing wireless network by executing a scan phase specified by the Wi-Fi Direct and performing a search on a plurality of channels, and the second search mode is a mode for discovering an apparatus not connected to the existing wireless network by omitting the scan phase, executing a find phase specified by the Wi-Fi Direct and performing a search on a specified part of the plurality of channels; and
connecting to the searched partner apparatus based on the Wi-Fi Direct.

2. The communication apparatus according to claim 1, further comprising a display unit configured to, when a plurality of other communication apparatuses has been searched, display a screen for selecting one of the other communication apparatuses, which becomes a connection partner apparatus.

3. The communication apparatus according to claim 1, wherein the received user instruction is an instruction to specify whether to join an existing network or to establish a new network.

4. The communication apparatus according to claim 1, wherein, in the first search mode, a probe request is transmitted to the plurality of channels, or a beacon transmitted to the plurality of channels are received,
wherein, in the second search mode, a probe request is transmitted to the specified part of the plurality of channels.

5. The communication apparatus according to claim 2, further comprising causing the display unit to display a screen for prompting the user to select the search mode.

6. The communication apparatus according to claim 3, wherein when the user selects to join the existing network, search another communication apparatus establishing the existing network, and, when the user selects to establish the new network, search another communication apparatus not establishing the existing network.

7. The communication apparatus according to claim 3, wherein, in a case where to join an existing network is specified, the first search mode is selected, and, in a case where to establish a new network is specified, the second search mode is selected.

8. The communication apparatus according to claim 6, wherein the another communication apparatus establishing the existing network operates as an access point of a wireless LAN.

9. A control method of a communication apparatus comprising:
receiving a user instruction to select a search mode for searching a partner apparatus that performs communication conforming to a standard of Wi-Fi Direct;
searching, according to the received user instruction, a partner apparatus conforming to the standard of Wi-Fi Direct based on a first search mode or a second search mode,
wherein the first search mode is a mode for discovering an existing wireless network by executing a scan phase specified by the Wi-Fi Direct and performing a search on a plurality of channels, and the second search mode is a mode for discovering an apparatus not connected to the existing wireless network by omitting the scan phase, executing a find phase specified by the Wi-Fi Direct and performing a search on a specified part of the plurality of channels; and
connecting to the searched partner apparatus based on the Wi-Fi Direct.

10. A non-transitory recording medium storing a program for causing a computer to perform a method of a communication apparatus, the method comprising:
receiving a user instruction to select a search mode for searching a partner apparatus that performs communication conforming to a standard of Wi-Fi Direct;
searching, according to the received user instruction, a partner apparatus conforming to the standard of Wi-Fi Direct based on a first search mode or a second search mode,
wherein the first search mode is a mode for discovering an existing wireless network by executing a scan phase specified by the Wi-Fi Direct and performing a search on a plurality of channels, and the second search mode is a mode for discovering an apparatus not connected to the existing wireless network by omitting the scan phase, executing a find phase specified by the Wi-Fi Direct and performing a search on a specified part of the plurality of channels; and connecting to the searched partner apparatus based on the Wi-Fi Direct.

* * * * *